(12) United States Patent
Zhang et al.

(10) Patent No.: US 7,348,298 B2
(45) Date of Patent: Mar. 25, 2008

(54) ENHANCING THERMAL CONDUCTIVITY OF FLUIDS WITH GRAPHITE NANOPARTICLES AND CARBON NANOTUBE

(75) Inventors: Zhiqiang Zhang, Lexington, KY (US); Frances E. Lockwood, Georgetown, KY (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 295 days.

(21) Appl. No.: 10/730,762

(22) Filed: Dec. 8, 2003

(65) Prior Publication Data
US 2004/0209782 A1 Oct. 21, 2004

Related U.S. Application Data

(63) Continuation-in-part of application No. PCT/US02/16888, filed on May 30, 2002.

(51) Int. Cl.
C10M 169/04 (2006.01)
C10M 125/02 (2006.01)
(52) U.S. Cl. .................. 508/113; 977/742; 977/745
(58) Field of Classification Search ............ 508/113; 977/742, 745
See application file for complete search history.

(56) References Cited

U.S. PATENT DOCUMENTS

| | | | |
|---|---|---|---|
| 4,209,408 A * | 6/1980 | Hoke ..................... 508/447 |
| 4,372,861 A | 2/1983 | Chao et al. |
| 4,434,064 A | 2/1984 | Chao et al. |
| 5,165,909 A | 11/1992 | Tennent et al. |
| 5,292,444 A | 3/1994 | Patil et al. |
| 5,292,813 A | 3/1994 | Patil et al. |
| 5,372,798 A | 12/1994 | McConnachie et al. |
| 5,445,759 A | 8/1995 | Powell |
| 5,454,961 A | 10/1995 | Schriver et al. |
| 5,523,006 A | 6/1996 | Strumban |
| 5,652,201 A * | 7/1997 | Papay et al. ............ 508/228 |
| 5,786,309 A | 7/1998 | Bradic |
| 5,958,523 A | 9/1999 | Bradic |
| 6,099,965 A * | 8/2000 | Tennent et al. ......... 428/408 |
| 6,221,275 B1 | 4/2001 | Choi et al. |
| 6,231,980 B1 | 5/2001 | Cohen et al. |
| 6,419,717 B2 * | 7/2002 | Moy et al. ............... 44/457 |
| 6,432,320 B1 * | 8/2002 | Bonsignore et al. ...... 252/70 |
| 6,695,974 B2 * | 2/2004 | Withers et al. .......... 252/70 |
| 6,783,746 B1 | 8/2004 | Zhang et al. |
| 6,828,282 B2 | 12/2004 | Moy et al. |
| 2001/0041663 A1 | 11/2001 | Moy et al. |
| 2002/0042348 A1 | 4/2002 | McNeil et al. |
| 2002/0076125 A1 | 6/2002 | Iso et al. |
| 2002/0100578 A1 | 8/2002 | Withers et al. |
| 2003/0170167 A1 * | 9/2003 | Nikolaev et al. ........ 423/447.1 |
| 2005/0008560 A1 | 1/2005 | Kataoka et al. |

OTHER PUBLICATIONS

Marquis, F.D.S. and Chibante, L.P.F., "Improving the Heat Transfer of Nanofluids and Nanolubricants with Carbon Nanotubes", JOM, Dec. 2005, 32.*
http://www.chevron.com/products/prodserv/BaseOils/grp2_typical.shtml□□http://www.chevron.com/products/prodserv/BaseOils/grp3_typical.shtml.*
Marquis, F.D.S. and Chibante, L.P.F., "Improving the Heat Transfer of Nanofluids and Nanolubricants with Carbon Nanotubes," JOM, Dec. 2005, p. 32, USA.
Smalheer, C.V. and Smith, R. Kennedy, "Lubricant Additives," 1967, pp. 1-11, USA.
http://www.chevron.com/products/prodserv/BaseOils/grp2_typical.shtml, 2006.
http://www.chevron.com/products/prodserv/BaseOils/grp3_typical.shtml, 2006.
Gong, Xiaovi et al., "Surfactant-assisted processing of carbon nanoyube/polymer composites," Chemistry of Materials, Jan. 2000, pp. 1047-1052, 12(4), USA.

* cited by examiner

Primary Examiner—Glenn Caldarola
Assistant Examiner—Jim Goloboy
(74) Attorney, Agent, or Firm—Carrithers Law Office PLLC; David W. Carrithers

(57) ABSTRACT

A fluid media such as oil or water, and a selected effective amount of carbon nanomaterials necessary to enhance the thermal conductivity of the fluid. One of the preferred carbon nanomaterials is a high thermal conductivity graphite, exceeding that of the neat fluid to be dispersed therein in thermal conductivity, and ground, milled, or naturally prepared with mean particle size less than 500 nm, and preferably less than 200 nm, and most preferably less than 100 nm. The graphite is dispersed in the fluid by one or more of various methods, including ultrasonication, milling, and chemical dispersion. Carbon nanotubes with graphitic structure is another preferred source of carbon nanomaterial, although other carbon nanomaterials are acceptable. To confer long term stability, the use of one or more chemical dispersants is preferred. The thermal conductivity enhancement, compared to the fluid without carbon nanomaterial, is proportional to the amount of carbon nanomaterials (carbon nanotubes and/or graphite) added.

50 Claims, No Drawings

ENHANCING THERMAL CONDUCTIVITY OF FLUIDS WITH GRAPHITE NANOPARTICLES AND CARBON NANOTUBE

This application is a Continuation-In-Part of pending PCT Patent Application Ser. No. PCT/US02/16888 filed on May 30, 2002 which is hereby incorporated by reference in its entirety.

This application is part of a government project, Contract No. W031-109-ENG-38 by the Department of Energy. The Government has certain rights in this invention.

BACKGROUND OF THE INVENTION

1. Technical Field

Fluids of enhanced thermal conductivity are prepared by dispersing carbon nanomaterials of a selected thermal conductivity into the fluid serving as the liquid medium. Dispersion is achieved by physical and chemical treatments. Methods are described and fluid compositions are identified which exhibit enhanced thermal conductivity due to the dispersion of carbon nanomaterials in aqueous and/or petroleum liquid medium utilizing selected dispersants and mixing methods to form stable carbon nanomaterial dispersions.

2. Description of the Prior Art

Lubricants and coolants of various types are used in equipment and in manufacturing processes to remove waste heat, among other functions. Traditionally, water is most preferred for heat removal, however, to expand its working range, freeze depressants such as ethylene glycol and/or propylene glycol are sometimes added, typically at levels above 10% concentration by volume, for example, automotive coolant is typically a mixture of 50-70% ethylene glycol, the remainder water. The thermal conductivity of the freeze depressed fluid is then about ⅔ as good as water alone. In many processes and applications, water can not be used for various reasons, and then a type of oil, e.g. mineral oil, polyalpha olefin oil, ester synthetic oil, ethylene oxide/propylene oxide synthetic oil, polyalkylene glycol synthetic oil, etc. are used. The thermal conductivity of these oils, is typically 0.1 to 0.17 W/m-K at room temperature, and thus they are inferior to water, with comparable thermal conductivity of 0.61 W/m-K, as heat transfer agents. Usually these oils have many other important functions, and they are carefully formulated to perform to exacting specifications for example for friction, wear performance, low temperature performance, etc. Often designers will desire a fluid with higher thermal conductivity than the conventional oil, but are restricted to oil due to the many other parameters the fluid must meet.

The use of graphite solids in fluids such as lubricants is well known. The graphite is added as a friction reducing agent, which also carries some of the load imposed on the working fluid, and therefore helps to reduce surface damage to working parts; however, the thermal conductivity property of the graphite is not an important consideration in conventional applications. While there have been various patents filed on lubricants containing graphite, e.g. U.S. Pat. No. 6,169,059, there are none which specifically rely on graphite to improve the thermal conductivity of the fluid.

While graphite-containing automotive engine oil was once commercialized (ARCO graphite), the potential to use graphite as a heat transfer improving material in this oil was not realized. The particle size of graphite used was larger (on the order of one to several microns) than for the instant invention. As a result, the graphite incorporated in the aforementioned automotive engine oil had strong settling tendency in the fluid. Graphite of this size also significantly effected the friction and wear properties of the fluid, and heretofore has been used to reduce friction and improve wear performance of the fluid, e.g. in metalworking fluids. The use of graphite in lubricants for recirculating systems was made unpopular, partly due to the publication by NASA that graphite could pile up in restricted flow areas in concentrated contacts, thereby leading to lubricant starvation. No recognition on the effect of graphite particle size on this phenomena was ever established. Furthermore, none of the prior art references teach the use of utilizing nano-sized graphite particles with mean particle size less than 500 nm to enhance thermal conductivity in fluids.

Carbon nanotubes are a new form of the nanomaterial formed by elemental carbon, which possesses different properties than the other forms of the carbon materials. It has unique atomic structure, very high aspect ratio, and extraordinary mechanical properties (strength and flexibility), making them ideal reinforcing fibers in composites and other structural materials.

Carbon nanotubes are characterized as generally to rigid porous carbon three dimensional structures comprising carbon nanofibers and having high surface area and porosity, low bulk density, low amount of micropores and increased crush strength and to methods of preparing and using such structures. The instant process is applicable to nanotubes with or without amorphous carbon.

The term "nanofiber" refers to elongated structures having a cross section (e.g., angular fibers having edges) or diameter (e.g., rounded) less than 1 micron. The structure may be either hollow or solid. Accordingly, the term includes "bucky tubes" and "nanotubes". The term nanofibers also refers to various fibers, particularly carbon fibers, having very small diameters including fibrils, whiskers, nanotubes, buckytubes, etc. Such structures provide significant surface area when incorporated into a structure because of their size and shape. Moreover, such fibers can be made with high purity and uniformity. Preferably, the nanofiber used in the present invention has a diameter less than 1 micron, preferably less than about 0.5 micron, and even more preferably less than 0.1 micron and most preferably less than 0.05 micron. Carbon nanotubes are typically hollow graphite tubules having a diameter of generally several to several tens nanometers which exist in many forms either as discrete fibers or aggregate particles of nanofibers The term "internal structure" refers to the internal structure of an assemblage including the relative orientation of the fibers, the diversity of and overall average of fiber orientations, the proximity of the fibers to one another, the void space or pores created by the interstices and spaces between the fibers and size, shape, number and orientation of the flow channels or paths formed by the connection of the void spaces and/or pores. The structure may also include characteristics relating to the size, spacing and orientation of aggregate particles that form the assemblage. The term "relative orientation" refers to the orientation of an individual fiber or aggregate with respect to the others (i.e., aligned versus non-aligned). The "diversity of" and "overall average" of fiber or aggregate orientations refers to the range of fiber orientations within the structure (alignment and orientation with respect to the external surface of the structure).

Carbon fibrils can be used to form a rigid assemblage or be made having diameters in the range of 3.5 to 70 nanometers. The fibrils, buckytubes, nanotubes and whiskers that are referred to in this application are distinguishable from continuous carbon fibers commercially available as reinforcement materials. In contrast to nanofibers, which have desirably large, but unavoidably finite aspect ratios, continuous carbon fibers have aspect ratios (L/D) of at least $10^4$ and often $10^6$ or more. The diameter of continuous fibers is also far larger than that of fibrils, being always >1.0 microns and typically 5 to 7 microns. Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanofiber chemistry. Carbon nanofibrils are vermicular carbon deposits having diameters less than 1.0 micron, preferably less than 0.5 micron, even more preferably less than 0.2 micron and most preferably less than 0.05 micron. They exist in a variety of forms and have been prepared through the catalytic decomposition of various carbon-containing gases at metal surfaces.

Carbon nanotubes are typically hollow graphite tubules having a diameter of generally several to several tens nanometers. Carbon nanotubes exist in many forms. The nanofibers can be in the form of discrete fibers or aggregate particles of nanofibers. The former results in a structure having fairly uniform properties. The latter results in a structure having two-tiered architecture comprising an overall macrostructure comprising aggregate particles of nanofibers bonded together to form the porous mass and a microstructure of intertwined nanofibers within the individual aggregate particles. For instance, one form of carbon fibrils are characterized by a substantially constant diameter, length greater than about 5 times the diameter, an ordered outer region of catalytically grown, multiple, substantially continuous layers of ordered carbon atoms having an outside diameter between about 3.5 and 70 nanometers, and a distinct inner core region. Each of the layers and the core are disposed substantially concentrically about the cylindrical axis of the fibril. The fibrils are substantially free of pyrolytically deposited thermal carbon with the diameter of the fibrils being equal to the outside diameter of the ordered outer region.

Moreover, a carbon fibril suitable for use with the instant process defines a cylindrical carbon fibril characterized by a substantially constant diameter between 3.5 and about 70 nanometers, a length greater than about 5 times the diameter, an outer region of multiple layers of ordered carbon atoms and a distinct inner core region, each of the layers and the core being disposed concentrically about the cylindrical axis of the fibril. Preferably the entire fibril is substantially free of thermal carbon overcoat. The term "cylindrical" is used herein in the broad geometrical sense, i.e., the surface traced by a straight line moving parallel to a fixed straight line and intersecting a curve. A circle or an ellipse are but two of the many possible curves of the cylinder. The inner core region of the fibril may be hollow, or may comprise carbon atoms which are less ordered than the ordered carbon atoms of the outer region. "Ordered carbon atoms," as the phrase is used herein means graphitic domains having their c-axes substantially perpendicular to the cylindrical axis of the fibril. In one embodiment, the length of the fibril is greater than about 20 times the diameter of the fibril. In another embodiment, the fibril diameter is between about 7 and about 25 nanometers.

In another embodiment the inner core region has a diameter greater than about 2 nanometers.

Dispersing the nanotubes into organic and aqueous medium has been a serious challenge. The nanotubes tend to aggregate, form agglomerates, and separate from the dispersion.

Some industrial applications require a method of preparing a stable dispersion of a selected carbon nanomaterials in a liquid medium. For instance, U.S. Pat. No. 5,523,006 by Strumban teaches the user of a surfactant and an oil medium; however, the particles are Cu—Ni—Sn—Zn alloy particles with the size from 0.01 μm and the suspension is stable for a limited period of time of approximately 30 days. Moreover, the surfactants do not include the dispersants typically utilized in the lubricant industry.

U.S. Pat. No. 5,560,898 by Uchida et al. teaches that a liquid medium is an aqueous medium containing a surfactant; however, the stability of the suspension is of little consequence in that the liquid is centrifuged upon suspension.

U.S. Pat. No. 5,853,877 by Shibuta teaches dispersing disentangled nanotubes in a polar solvent and forming a coating composition with additives such as dispersing agents; however, a method of obtaining a stable dispersion is not taught.

U.S. Pat. No. 6,099,965 by Tennent et al. utilizes a kneader for mixing a dispersant with other reactants in a liquid medium, yet sustaining the stability of the dispersion is not taught.

The potential of carbon nanotubes to convey thermal conductivity in a material is mentioned in U.S. Pat. No. 5,165,909; however, actual measurement of the thermal conductivity of the carbon fibrils they produced was not given in the patent, so the inference of thermal conductivity is general and somewhat speculative, based on graphitic structure. Bulk graphite with high thermal conductivity is available from POCO GRAPHITE as a graphite foam having a thermal conductivity of greater than 100 W/m-K, and from Carbide having a high thermal conductivity as well. These bulk materials must be reduced to a powder of nanometer size by various methods for use in the instant invention.

SUMMARY OF THE INVENTION

In this invention, fluids of enhanced thermal conductivity are prepared by dispersing carbon nanomaterials of a selected thermal conductivity measured in W/m-K into a selected neat fluid which serve as a liquid solvent medium or carrier. Dispersion of the nanomaterials throughout the selected liquid medium is achieved by physical and chemical treatments to yield a fluid composition having an enhanced thermal conductivity as compared to the neat fluid alone.

Fluid compositions that have enhanced thermal conductivity, up to 250% greater than their conventional analogues, and methods of preparation for these fluids are identified. The compositions contain at a minimum, a fluid media such as oil or water, and a selected effective amount of particles necessary to enhance the thermal conductivity of the fluid. The graphite is a high thermal conductivity graphite, exceeding that of the neat fluid to be dispersed therein in thermal conductivity, and ground, milled, or naturally prepared with mean particle size less than 500 nm, and preferably less than 200 nm, and most preferably less than 100 nm. The graphite is dispersed in the fluid by one or more of various methods, including ultrasonication, milling, and chemical dispersion. Carbon nanotube with graphitic structure is another preferred source of carbon nanomaterials, although other nanomaterials are acceptable. To confer long term stability, the use of one or more chemical dispersants is preferred. The thermal conductivity enhancement, compared to the fluid without carbon nanomaterial, is somehow proportional to the amount of carbon nanomaterial added.

The present invention provides a fluid containing up to 90% carbon nanomaterials. Very good results were obtained with nanomaterial loadings in a range of up to 20 percent by weight and more particularly from 0.001 to 10 percent by weight, and more typically from 0.01 to 2.5 percent by weight. Well dispersed stable nanotube/nanoparticle in oil suspensions with up to 2.5 percent by weight carbon nanomaterials resulted in surprisingly good enhancement of the thermal characteristics of the fluids developed according to the present invention. Preferably, a minimum of one or more chemical dispersing agents and/or surfactants is also added to achieve long term stability. The term "dispersant" in the instant invention refers to a surfactant added to a medium to promote uniform suspension of extremely fine solid particles, often of colloidal size. In the lubricant industry the term "dispersant" is generally accepted to describe the long chain oil soluble or dispersible compounds which function to disperse the "cold sludge" formed in engines. The term "surfactant" in the instant invention refers to any chemical compound that reduces surface tension of a liquid when dissolved into it, or reduces interfacial tension between two liquids or between a liquid and a solid. It is usually, but not exclusively, a long chain molecule comprised of two moieties; a hydrophilic moiety and a lipophilic moiety. The hydrophilic and lipophilic moieties refer to the segment in the molecule with affinity for water, and that with affinity for oil, respectively. These two terms are mostly used interchangeably in the instant invention. The particle-containing fluid of the instant invention will have a thermal conductivity higher than the neat fluid, in this case the term "neat" is defined as the fluid before the particles are added. The fluid can have any other chemical agents or other type particles added to it as well to impart other desired properties, e.g. friction reducing agents, antiwear or anti-corrosion agents, detergents, antioxidants, etc. Furthermore, the term fluid in the instant invention is broadly defined to include pastes, gels, greases, foam, and liquid crystalline phases in either organic or aqueous media, emulsions and microemulsions.

As set forth above, the preferred carbon nanomaterial is restricted to any graphitic nanomaterials with bulk thermal conductivity exceeding that of the neat fluid to be enhanced. For instance, the thermal conductivity of oil is about 0.2 W/m-K; the thermal conductivity of antifreeze (water and alcohol and/or glycol mixtures) is usually about 0.4 W/m-K; and the thermal conductivity of water is about 0.6 W/m-K. For most applications, a carbon nanomaterial in the form of a carbon nanotube or graphite nanoparticle is chosen having a thermal conductivity exceeding 80 W/m-K. A preferred form of carbon nanomaterial is carbon nanotubes.

The carbon nanomaterial containing dispersion may also contain a large amount of one or more other chemical compounds, such as polymers, antiwear agents, friction reducing agents, anti-corrosion agents, detergents, metal passivating agents, antioxidants, etc. that are not for the purpose of dispersing, but to achieve thickening or other desired fluid characteristics.

Furthermore, the dispersed nanomaterial solution can be pre-sheared, in a turbulent flow such as a nozzle, or high pressure fuel injector, or ultrasonic device, in order to achieve a stable viscosity. This may be desirable in the case where carbon nanotubes with high aspect ratio are used as the carbon nanomaterial source, since they will thicken the fluid but lose viscosity when exposed in turbulent flows such as engines.

DESCRIPTION OF THE PREFERRED EMBODIMENT

The present invention provides a carbon nanomaterial dispersion in fluid medium that gives a high thermal conductivity compared to conventional fluids of the same medium.

The preferred carbon nanomaterials are carbon nanotubes, the nanotubes can be either single-walled, or multi-walled, having a typical nanoscale diameter of 1 500 nanometers. More typically the diameter is around 10-30 nanometers. The length of the tube can be in submicron and micron scale, usually from 500 nanometers to 500 microns. More typical length is 1 micron to 100 microns. The aspect ratio of the tube can be from hundreds to thousands, more typical 500 to 5000. The surface of the nanotube can be treated chemically to achieve certain level of hydrophilicity, or left as is from the production. Other acceptable carbon nanomaterials are available, e.g. POCOFOAM, available from PocoGraphite, Inc., located in Decatur, Tex., POCOFOAM is a high thermal conductivity foamed graphite, thermal conductivity from 100 to 150 W/m-K. To prepare it for the instant invention, it must be pulverized to a fine powder, dispersed chemically and physically in the fluid of choice, and then ball milled or otherwise size reduced until a particle size of less than 500 nm mean size is attained. The finer the particle size attained upon milling, the better. In general, any high thermal conductivity graphite can be used, provided that pulverization, milling and other described chemical and physical methods can be used to reduce the size of the final graphite particles to below a mean particle size of 500 nm.

Oil Basestocks

The petroleum liquid medium can be any petroleum distillates or synthetic petroleum oils, greases, gels, or oil-soluble polymer composition. More typically, it is the mineral basestocks or synthetic basestocks used in the lube industry, e.g., Group I (solvent refined mineral oils), Group II (hydrocracked mineral oils), Group III (severely hydrocracked oils, sometimes described as synthetic or semi-synthetic oils), Group IV (polyalphaolefins), and Group VI (esters, naphthenes, and others). One preferred group includes the polyalphaolefins, synthetic esters, and polyalkylglycols.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-octenes), poly(1-decenes), etc., and mixtures thereof; alkylbenzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.), alkylated diphenyl, ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic oils.

Another suitable class of synthetic oils comprises the esters of dicarboxylic acids (e.g., phtalic acid, succinic acid, alkyl succinic acids and alkenyl succinic acids, maleic acid, azelaic acid, suberic acid, sebacic acid, fumaric acid, adipic acid, alkenyl malonic acids, etc.) with a variety of alcohols (e.g., butyl alcohol, hexyl alcohol, dodecyl alcohol, 2-ethylhexyl alcohol, ethylene glycol diethylene glycol monoether, propylene glycol, etc.). Specific examples of these esters include dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and the like.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, etc. Other synthetic oils include liquid esters of phosphorus-containing acids (e.g., tricresyl phosphate, trioctyl phosphate, diethyl ester of decylphosphonic acid, etc.), polymeric tetrahydrofurans and the like.

Polyalphaolefins (PAO), useful in the present invention include those sold by BP Amoco Corporation as DURASYN fluids, those sold by Exxon-Mobil Chemical Company, (formerly Mobil Chemical Company) as SHF fluids, and those sold by Ethyl Corporation under the name ETHYL-FLO, or ALBERMARLE. PAO's include the ETHYL-FLOW series by Ethyl Corporation, Albermarle Corporation, including ETHYL-FLOW 162, 164, 166, 168, and 174, having varying viscosity from about 2 to about 460 centistokes.

MOBIL SHF-42 from Exxon-Mobil Chemical Company, EMERY 3004 and 3006, and Quantum Chemical Company provide additional polyalphaolefins basestocks. For instance, EMERY 3004 polyalphaolefin has a viscosity of 3.86 centistokes (cSt) at 212° F. (100° C.) and 16.75 cSt at 104° F. (40° C.). It has a viscosity index of 125 and a pour point of −98° F. and it also has a flash point of about 432° F. and a fire point of about 478° F. Moreover, EMERY 3006 polyalphaolefin has a viscosity of 5.88 cSt at +212° F. and 31.22 cSt at +104° F. It has a viscosity index of 135 and a pour point of −87° F.

Additional satisfactory polyalphaolefins are those sold by Uniroyal Inc. under the brand SYNTON PAO-40, which is a 40 centistoke polyalphaolefin.

It is contemplated that Gulf Synfluid 4 cSt PAO, commercially available from Gulf Oil Chemicals Company, a subsidiary of Chevron-Texaco Corporation, which is similar in many respects to EMERY 3004 may also be utilized herein. MOBIL SHF-41 PAO, commercially available from Mobil Chemical Corporation, is also similar in many respects to EMERY 3004.

Especially useful are the polyalphaolefins will have a viscosity in the range of up to 100 centistoke at 100° C., with viscosity of 2 and 10 centistoke being more preferred.

The most preferred synthetic based oil ester additives are polyolesters and diesters such as di-aliphatic diesters of alkyl carboxylic acids such as di-2-ethylhexylazelate, di-isodecyladipate, and di-tridecyladipate, commercially available under the brand name EMERY 2960 by Emery Chemicals, described in U.S. Pat. No. 4,859,352 to Waynick. Other suitable polyolesters are manufactured by Mobil Oil. MOBIL polyolester P-43, NP343 containing two alcohols, and Hatco Corp. 2939 are particularly preferred.

Diesters and other synthetic oils have been used as replacements of mineral oil in fluid lubricants. Diesters have outstanding extreme low temperature flow properties and good residence to oxidative breakdown.

The diester oil may include an aliphatic diester of a dicarboxylic acid, or the diester oil can comprise a dialkyl aliphatic diester of an alkyl dicarboxylic acid, such as di-2-ethyl hexyl azelate, di-isodecyl azelate, di-tridecyl azelate, di-isodecyl adipate, di-tridecyl adipate. For instance, Di-2-ethylhexyl azelate is commercially available under the brand name of EMERY 2958 by Emery Chemicals.

Also useful are polyol esters such as EMERY 2935, 2936, and 2939 from Emery Group of Henkel Corporation and HATCO 2352, 2962, 2925, 2938, 2939, 2970, 3178, and 4322 polyol esters from Hatco Corporation, described in U.S. Pat. No. 5,344,579 to Ohtani et al. and MOBIL ESTER P 24 from Exxon-Mobil Chemical Company. Esters made by reacting dicarboxylic acids, glycols, and either monobasic acids or monohydric alcohols like EMERY 2936 synthetic-lubricant basestocks from Quantum Chemical Corporation and MOBIL P 24 from Exxon-Mobil Chemical Company can be used. Polyol esters have good oxidation and hydrolytic stability. The polyol ester for use herein preferably has a pour point of about −100° C. or lower to −40° C. and a viscosity of about 2 to 100 centistoke at 100° C.

A hydrogenated oil is a mineral oil subjected to hydrogennation or hydrocracking under special conditions to remove undesirable chemical compositions and impurities resulting in a base oil having synthetic oil component and properties. Typically the hydrogenated oil is defined by the American Petroleum Institute as a Group III base oil with a sulfur level less than 0.03 with saturates greater than or equal to 90 and a viscosity index of greater than or equal to 120. Most useful are hydrogenated oils having a viscosity of from 2 to 60 CST at 100 degrees centigrade. The hydrogenated oil typically provides superior performance to conventional motor oils with no other synthetic oil base. The hydrogenated oil may be used as the sole base oil component of the instant invention providing superior performance to conventional mineral oil bases oils or used as a blend with mineral oil and/or synthetic oil. An example of such an oil is YUBASE-4.

When used in combination with another conventional synthetic oil such as those containing polyalphaolefins or esters, or when used in combination with a mineral oil, the hydrogenated oil may be utilized as the oil base stock in an amount of up to 100 percent by volume, more preferably from about 10 to 80 percent by volume, more preferably from 20 to 60 percent by volume and most preferably from 10 to 30 percent by volume of the base oil composition.

A Group I or II mineral oil basestock may be incorporated in the present invention as a portion of the concentrate or a basestock to which the concentrate may be added. Preferred as mineral oil basestocks are the ASHLAND 325 Neutral defined as a solvent refined neutral having a SABOLT UNIVERSAL viscosity of 325 SUS @ 100° F. and ASHLAND 100 Neutral defined as a solvent refined neutral having a SABOLT UNIVERSAL viscosity of 100 SUS @ 100° F., manufactured by the Marathon Ashland Petroleum.

Other acceptable petroleum-base fluid compositions include white mineral, paraffinic and MVI naphthenic oils having the viscosity range of about 20-400 centistokes. Preferred white mineral oils include those available from Witco Corporation, Arco Chemical Company, PSI and Penreco. Preferred paraffinic oils include API Group I and II oils available from Exxon-Mobil Chemical Company, HVI neutral oils available from Shell Chemical Company, and Group II oils available from Arco Chemical Company. Preferred MVI naphthenic oils include solvent extracted oils available from Equilon Enterprises and San Joaquin Refining, hydrotreated oils available from Equilon Enterprises and Ergon Refining, and naphthenic oils sold under the names HYDROCAL and CALSOL by Calumet, and described in U.S. Pat. No. 5,348,668 to Oldiges.

Finally, the thermal conductivity of vegetable oils may also be enhanced and utilized as the liquid medium in the instant invention.

Aqueous Medium

A selected aqueous medium is water, or it can be any water-based solution including alcohol or its derivatives, such as ethylene glycol, propylene glycol, or any water-soluble inorganic salt, e.g. molybdate salts, nitrates, nitrites, methyl alcohol, ethyl alcohol, propyl alcohol, isopropyl alcohol, and combinations thereof, or organic compounds, such as aromatic and/or aliphatic carboxylate acids more, particularly short chain mono- and di-carboxylic acids. Such solutions are typically utilized as antifreeze constituents and may include other corrosion resistant additives together with the carbon nanomaterial dispersed therein providing enhance thermal properties.

Dispersants

Dispersants Used in Lubricant Industry

Dispersants used in the lubricant industry are typically used to disperse the cold sludge formed in gasoline and diesel engines, which can be either ashless dispersants or containing metal atoms. They can be used in the instant invention since they have been found to be an excellent dispersing agent for soot, an amorphous form of carbon particles generated in the engine crankcase and incorporated with dirt and grease.

The ashless dispersants commonly used in the automotive industry contain an lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 carbon atoms to ensure oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substituted polyisobutenyl succinimides and succinates, allkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, bis-hydroxypropyl phosphorate. For instance, bis-succinimide is a dispersant based on polybutene and an amine which is suitable for oil based dispersions and is commercially available under the tradenames of INFINEUM C9231, INFINEUM C9232, and INFINEUM C9235 which is sold by Infineum, USA, L.P. The C9231 is borated while the C9232 and C9235 are not; however, all are bis-succinimides which differ due to their amine to polymer ratio.

The dispersant may be combined with other additives used in the lubricant industry to form a dispersant-detergent (DI) additive package, e.g., LUBRIZOL™ 9802A and/or the concentrated package (LUBRIZOL™ 9802AC), which are mixed Dispersants having a high molecular weight succinimide and ester-type dispersant as the active ingredient, and which also contains from about 5 to 9.9 percent by weight of zinc alkyldithiophosphate, from 1 to 4.9 percent by weight of a substituted phenol, from 1 to 4.9 percent of a calcium sulfonate, and from 0.1 to 0.9 percent by weight of a diphenylamine; wherein the whole DI package can be used as dispersing agent for the carbon nanomaterial dispersion.

Another preferred dispersant package is LUBRIZOL OS#154250 which contains from about 20 to 29.9 percent by weight of a polyolefin amide alkeneamine, from 0.5 to 1.5 percent by weight of an alkylphosphite, about 1.1 percent by weight of a phosphoric acid, and from 0.1 to 0.9 percent by weight of a diphenylamine, with primary active ingredient believed to be polyisobutenyl succinimides and succinates. Another preferred dispersant package is a high molecular weight succinimide DI package for diesel engines LUBRIZOL™ 4999 which also contains from about 5 to 9.9 percent zinc alkyldithiophosphate by weight.

Other Types of Dispersants

Alternatively a surfactant or a mixture of surfactants with low HLB value (typically less than or equal to 8), preferably nonionic, or a mixture of nonionics and ionics, may be used in the instant invention.

The dispersant for the water based carbon nanomaterial dispersion, more specifically carbon nanotube dispersion, should be of high HLB value (typically less than or equal to 10), preferable nonylphenoxypoly (ethyleneoxy) ethanol-type surfactants are utilized.

In both the water and oil based cases, the dispersants selected should be soluble or dispersible in the liquid medium.

The dispersant can be in a range of up from 0.001 to 30 percent, more preferably in a range of from between 0.5 percent to 20 percent, more preferably in a range of from between 1.0 to 8.0 percent, and most preferably in a range of from between 2 to 6 weight percent.

The carbon nanotube or graphite nanoparticles can be of any desired weight percentage in a range of from 0.0001 up to 50 percent by weight providing for an effective amount to obtain the desired thermal enhancement of the selected fluid media. For practical application an effective amount of carbon nanomaterials is usually in a range of from between 0.01 percent to 20 percent, and more preferably in a range of from 0.02 to 10 percent, and most preferably in a range of from between 0.05 percent to 5 percent. The remainder of the formula is the selected medium comprising oil, water, or combinations thereof together with any chemical additives deemed necessary to provide lubricity, corrosion protection, viscosity, or the like.

It is believed that in the instant invention the dispersant functions by adsorbing onto the surface of the carbon nanotube.

Other Chemical Compounds

This dispersion may also contain a large amount of one or more other chemical compounds, preferably polymers, not for the purpose of dispersing, but to achieve thickening or other desired fluid characteristics.

The viscosity improvers used in the lubricant industry can be used in the instant invention for the oil medium, which include olefin copolymers (OCP), polymethacrylates (PMA), hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which can be used in the instant invention in either the aqueous medium or the oil medium include: acrylic polymers such as polyacrylic acid and sodium polyacrylate, high-molecular-weight polymers of ethylene oxide such as Polyox® WSR from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as DISPARLON AQ series from King Industries, hydrophobically modified ethylene oxide urethane (e.g., ACRYSOL series from Rohmax), silicates, and fillers such as mica, silicas, cellulose, wood flour, clays (including organoclays) and nanoclays, and resin polymers such as polyvinyl butyral resins, polyurethane resins, acrylic resins and epoxy resins.

Other chemical additives used in lubricants such as pour point depressant can also be used in the instant invention. Most pour point depressants are organic polymers, although some nonpolymeric substances have been shown to be effective. Commercial pour point depressants include alkylnaphthalenes, polymethacrylates, polyfumarates, styrene esters, oligomerized alkylphenols, phthalic acid esters, ethylenevinyl acetate copolymers, and other mixed hydrocarbon polymers. The treatment level of these additives is usually low. In nearly all cases, there is an optimum concentration above and below which pour point depressants become less effective.

Acrylic copolymers such as manufactured by Supeleo Inc. in Bellefonte, Pa. as Acryloid 3008 is a pour point depressant useful in the present invention.

Still other chemical additives used in lubricants, such as rust and oxidation inhibitors, demulsifiers, foam inhibitors, and seal-swelling agents can also be used in the instant invention.

Physical Agitation

The physical mixing includes high shear mixing, such as with a high speed mixer, homogenizers, microfluidizers, a KADY mill, a colloid mill, etc., high impact mixing, such as attritor, ball and pebble mill, etc., and ultrasonication methods.

Ultrasonication is the most preferred physical method in the instant invention since it is less destructive to the carbon nanomaterial, more specifically, carbon nanotube, structure than the other methods described. Ultrasonication can be done either in the bath-type ultrasonicator, or by the tip-type ultrasonicator. More typically, tip-type ultrasonication is applied for higher energy output. Sonication at the medium-high instrumental intensity for up to 30 minutes, and usually in a range of from 10 to 20 minutes is desired to achieve better homogeneity.

The raw material mixture may be pulverized by any suitable known dry or wet grinding method. One grinding method includes pulverizing the raw material mixture in the fluid mixture of the instant invention to obtain the concentrate, and the pulverized product may then be dispersed further in a liquid medium with the aid of the dispersants described above. However, pulverization or milling reduces the carbon nanotube average aspect ratio.

The instant method of forming a stable suspension of carbon nanomaterials in a solution consist of two steps. First select the appropriate dispersant for the carbon nanomaterials, which include carbon nanotube or graphite nanoparticles, and the medium, and dissolve the dispersant into the liquid medium to form a solution, and second add the carbon nanotube or graphite nanoparticles into the dispersant-containing solution while agitating, ball milling, or ultrasonicating the solution or any combination of physical methods named.

EXAMPLES

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein. Reference to documents made in the specification is intended to result in such patents or literature cited are expressly incorporated herein by reference, including any patents or other literature references cited within such documents as if fully set forth in this specification.

Example 1

| Components | Description | Weight percentage |
|---|---|---|
| Carbon nanotube | Surface untreated, aspect ratio 2000, diameter 25 nm, length 50 μm | 2.5 |
| Dispersant | High Mol. Wt. Polyammine DI package ORONITE (OLOA 9061) | 4.88 |
| Liquid solvent | Poly (α-olefin), 6 cSt | 92.62 |
| Sonication | FISHER SCIENTIFIC 550 Sonic Dismembrator, 15 minutes | |

As set forth in Example 1, the thermal conductivity of the above dispersion was 0.380 Wm-K for the fluid (solution of the dispersant and solvent) containing the thermally enhancing nanotubes, as compared to a thermal conductivity of 0.146 W/m-K for the fluid (solution of the dispersant and solvent) without the thermally enhancing nanotubes.

Example 2

| Components | Description | Weight percentage |
|---|---|---|
| Carbon nanotube | Surface untreated, aspect ratio 2000, diameter 25 nm, length 50 μm | 0.1 |
| Dispersant | High mol. Wt. Succinimide DI package for diesel engines LUBRIZOL ™ 4999 | 4.8 |
| Liquid solvent | Poly(α-olefin), 6 cSt | 95.1 |
| Sonication | FISHER SCIENTIFIC 550 Sonic Dismembrator, 15 minutes | |

Example 3

| Components | Description | Weight percentage |
|---|---|---|
| Carbon nanotube | Surface untreated, aspect ratio 2000, diameter 25 nm, length 50 microns | 0.1 |
| Dispersant | Mixed Dispersant (high mol. Wt. Succinimide and ester-type dispersant) DI package LUBRIZOL ™ 9802A | 4.8 |
| Liquid solvent | Poly(α-olefin), 6 cST | 95.1 |
| Sonication | FISHER SCIENTIFIC 550 Sonic Dismembrator, 15 minutes | |

Example 4

| Components | Description | Weight percentage |
|---|---|---|
| Carbon nanotube | Surface untreated, aspect ratio 2000, diameter 25 nm, length 50 μm | 0.10 |
| Dispersant | Bis-succinimide dispersant (INFINEUM C9231) | 4.80 |
| Liquid solvent | Poly(α-olefin), 6 cSt | 95.10 |
| Sonication | FISHER SCIENTIFIC 550 Sonic Dismembrator, 15 minutes | |

Example 5

| Components | Description | Weight percentage |
|---|---|---|
| Carbon nanotube | Surface untreated, aspect ratio 2000, diameter 25 nm, length 50 μm | 0.10 |
| Dispersant | Bis-succinimide dispersant INFINEUM C9232) | 4.80 |
| Liquid solvent | Poly(α-olefin), 6 cSt | 95.10 |
| Sonication | FISHER SCIENTIFIC 550 Sonic Dismembrator, 15 minutes | |

Example 6

| Components | Description | Weight percentage |
|---|---|---|
| Carbon nanotube | Surface untreated, aspect ratio 2000, diameter 25 nm, length 50 μm | 0.10 |
| Dispersant | Bis-succinimide dispersant (INFINEUM C9235) | 4.80 |
| Liquid solvent | Poly(α-olefin), 6 cSt | 95.10 |
| Sonication | FISHER SCIENTIFIC 550 Sonic Dismembrator, 15 minutes | |

| Components | Description | Weight percentage |
|---|---|---|
| Carbon nanotube | Surface treated | 0.10 |
| Dispersant | nonylphenoxy poly(ethyleneoxy) ethanol, branched | 5.00 |
| Liquid solvent | Water | 94.90 |
| Sonication | FISHER SCIENTIFIC 550 Sonic Dismembrator, 15 minutes | |

The dispersions in examples 1-7 are very uniform, and have not shown any sign of separation or aggregation for a year.

Example 8

| Components | Description | Weight percentage |
|---|---|---|
| Graphite nanoparticles | POCOFOAM after milling | 2.0 |
| Dispersant | Lubrizol ™ OS#154250 | 7.55 |
| VI Improver and Other Chemicals | Polyalkylmethacrylate, ACRYLOID 3008 ™ acrylic copolymer and red dye | 10.9 |
| Liquid solvent | Group III Base oil | 79.55 |
| Sonification | FISHER SCIENTIFIC 550 Sonic Dismembrator, 15 minutes | |

In Example 8, the graphite particles were obtained through pulverizing and milling the high thermal conductivity graphite foam (bulk thermal conductivity as 100 to 150 W/MK), known as POCOFOAM®, to the desired nanometer size range. It was first ground into coarse particles, and then dispersed into an oil solution with dispersants and other chemicals. The dispersion is then milled in a horizontal mill. The final dispersion after the milling is sonicated to achieve homogeneity.

As set forth in Example 8, the thermal conductivity of the above dispersion was 0.175 Wm-K for the fluid containing the thermally enhancing graphite particles, as compared to a thermal conductivity of 0.140 W/m-K for the base fluid (solution of the dispersant, viscosity index improver, and solvent) without the thermally enhancing graphite particles.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

The invention claimed is:

1. A thermally enhanced fluid composition, comprising:
   an effective amount of a selected neat fluid having a selected thermal conductivity;
   an effective amount of from 0.001 to 10 percent by weight of a selected carbon nanomaterial having an aspect ratio of from 500 to 5000 dispersed into said selected neat fluid, said selected carbon nanomaterial having a thermal conductivity greater than the thermal conductivity of said selected neat fluid in which the carbon nanomaterial is dispersed; and
   an effective amount of at least one chemical dispersing agent having a low hydrophile-lipophile balance (HLB) value of 8 or less.

2. The thermally enhanced composition of claim 1 wherein said carbon nanomaterial is surface treated to be hydrophilic at surface for ease of dispersing into the aqueous medium.

3. The thermally enhanced composition of claim 1 wherein the said dispersing agent is soluble in the said neat fluid.

4. The thermally enhanced composition of claim 1 wherein said neat fluid is selected from the group consisting of a petroleum distillate and a synthetic petroleum oil.

5. The thermally enhanced composition of claim 1, wherein said chemical dispersing agent is a surfactant.

6. The thermally enhanced composition of claim 5, wherein said surfactant is selected from the group consisting of a ionic surfactant and a mixture of a nonionic and ionic surfactant.

7. The thermally enhanced composition of claim 1, wherein said dispersing agent is a dispersant-detergent (DI) additive package.

8. The thermally enhanced composition of claim 1 wherein said neat fluid is a uniform dispersion in a form as a gel or paste.

9. The thermally enhanced composition of claim 1, wherein said neat fluid is a grease.

10. The composition of claim 1, wherein said carbon nanomaterial comprises carbon nanotubes and graphite nanoparticles.

11. The thermally enhanced composition of claim 1, wherein said carbon nanomaterial is selected from the group consisting of carbon nanotubes, graphite nanoparticles, and combinations thereof.

12. A thermally enhanced fluid composition, comprising:
   an effective amount of a selected neat fluid having a selected thermal conductivity; an effective amount of a selected carbon nanomaterial having a selected thermal conductivity up to 20 percent by weight having an aspect ratio of from 500 to 5000 dispersed into said selected neat fluid, said selected carbon nanomaterial having a thermal conductivity greater than the thermal conductivity of said selected neat fluid in which the carbon nanomaterial is dispersed: and
   an effective amount of at least one chemical dispersing agent having a low hydrophile-lipophile balance (HLB) value of 8 or less.

13. The thermally enhanced fluid composition of claim 1, wherein an effective amount of a selected carbon nanomaterial to obtain the desired thermal enhancement is from 0.01 to 5 percent by weight.

14. The thermally enhanced fluid composition of claim 1, including a selected amount of oil.

15. The thermally enhanced fluid composition of claim 1, wherein said effective amount of a selected carbon nanomaterial is from 0.001 to 2.0 percent by weight.

16. The thermally enhanced fluid composition of claim 1, wherein said selected carbon nanomaterial has a thermal conductivity exceeding 80 W/m-K.

17. The thermally enhanced fluid composition of claim 1, wherein said neat fluid comprises a petroleum liquid medium selected from the group consisting of a petroleum distillate, a synthetic petroleum oil, a grease, a gel, a oil-soluble polymer composition, and combinations thereof.

18. The thermally enhanced fluid composition of claim 1, wherein said neat fluid is selected from the group consisting of Group I (solvent refined mineral oils), Group II (hydrocracked mineral oils), Group III (severely hydrocracked hydrogenated oils), Group IV (polyalphaolefins), Group VI (esters, naphthenes, and polyalkylglycols), and combinations thereof.

19. The thermally enhanced fluid composition of claim 1, wherein said neat fluid is selected from the group of synthetic hydrocarbon oils, halo-substituted hydrocarbon oils, polymerized and interpolymerized olefins, polybutylenes, polypropylenes, propylene-isobutylene copolymers, chlorinated polybutylenes, poly(1-octenes), poly(1-decenes), alkylbenzenes, dodecylbenzenes, tetradecylbenzenes, dinonylbenzenes, di-(2-ethylhexyl)benzenes, polyphenyls, biphenyls, terphenyls, alkylated polyphenyls, alkylated diphenyl, ethers, alkylated diphenyl sulfides, and combinations thereof.

20. The thermally enhanced fluid composition of claim 1, wherein said neat fluid is selected from the group consisting of the esters of dicarboxylic acids selected from the group consisting of phtalic acid, succinic acid, alkyl succinic acids and alkenyl succinic acids, maleic acid, azelaic acid, suberic acid, sebacic acid, fumaric acid, adipic acid, alkenyl malonic acids, with an alcohols selected from the group consisting of butyl alcohol, hexyl alcohol, dodecyl alcohol, 2-ethylhexyl alcohol, ethylene glycol diethylene glycol monoether, propylene glycol, dibutyl adipate, di(2-ethylhexyl) sebacate, di-hexyl fumarate, dioctyl sebacate, diisooctyl azelate, diisodecyl azealate, dioctyl phthalate, didecyl phthalate, dicicosyl sebacate, the 2-ethylhexyl diester of linoleic acid dimer, the complex ester formed by reacting one mole of sebacic acid with two moles of tetraethylene glycol and two moles of 2-ethylhexanoic acid, and combinations thereof.

21. The thermally enhanced fluid composition of claim 1, wherein said neat fluid is selected from the group consisting of esters made from $C_5$ to $C_{12}$ monocarboxylic acids and polyols and polyol ethers such as neopentyl glycol, trimethylolpropane, pentaerythritol, dipentaerythritol, tripentaerythritol, and combinations thereof.

22. The thermally enhanced fluid composition of claim 1, wherein said neat fluid is selected from a polyalphaolefins having a viscosity of up to 100 centistoke at 100° C.

23. The thermally enhanced fluid composition of claim 1, wherein said neat fluid is selected from the group of synthetic based oil ester additives consisting of polyolesters, diesters, di-aliphatic diesters of alkyl carboxylic acids, di-2-ethylhexylazelate, di-isodecyladipate, di-tridecyladipate, and combinations thereof.

24. The thermally enhanced fluid composition of claim 1, wherein said neat fluid is selected from the group of diesters consisting of an aliphatic diester of a dicarboxylic acid, a dialkyl aliphatic diester of an alkyl dicarboxylic acid, a di-2-ethyl hexyl azelate, a di-isodecyl azelate, a di-tridecyl azelate, a di-isodecyl adipate, a di-tridecyl adipate, and combinations thereof.

25. The thermally enhanced fluid composition of claim 1, wherein said neat fluid is selected from a hydrogenated oil having a sulfur level less than 0.03 with saturates greater than or equal to 90 and a viscosity index of greater than or equal to 120.

26. The thermally enhanced fluid composition of claim 1, wherein said neat fluid is a hydrogenated oil having a viscosity of from 2 to 60 CST at 100 degrees centigrade.

27. The thermally enhanced fluid composition of claim 1, wherein said neat fluid is a hydrogenated oil present in an amount of up to 99 percent by volume.

28. The thermally enhanced fluid composition of claim 1, wherein said neat fluid is selected from the water-based group consisting of an alcohol and its derivatives.

29. The thermally enhanced fluid composition of claim 1, wherein said neat fluid is selected from the water-based group consisting of an ethylene glycol, a propylene glycol, a methyl alcohol, an ethyl alcohol, a propyl alcohol, an isopropyl alcohol, and combinations thereof.

30. The thermally enhanced fluid composition of claim 1, wherein said dispersants are selected from the group consisting of an lipophilic hydrocarbon group, and a polar functional hydrophilic group.

31. The thermally enhanced fluid composition of claim 30, wherein said polar functional hydrophilic group is selected from the class of carboxylate, ester, amine, amide, imine, imide, hydroxyl, ether, epoxide, phosphorus, ester carboxyl, anhydride, or nitrile.

32. The thermally enhanced fluid composition of claim 1, wherein said dispersant is an ashless dispersant typically used in the petroleum industry selected from the group consisting of N-substituted polyisobutenyl succinimides and succinates, allkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides.

33. The thermally enhanced fluid composition of claim 1, wherein an effective amount of said dispersant present in an amount of from 0.001 to 30 percent by weight.

34. The thermally enhanced fluid composition of claim 1, wherein an effective amount of said dispersant present in an amount of from between 0.5 percent to 20 percent weight.

35. The thermally enhanced fluid composition of claim 1, wherein an effective amount of said dispersant present in an amount of from between 2 to 6 weight percent by weight.

36. The thermally enhanced fluid composition of claim 1, including an effective amount of a viscosity improver selected from the group consisting of an olefin copolymers (OCP), a polymethacrylates (PMA), a hydrogenated styrene-diene (STD), a styrene-polyester (STPE) polymers, and an olefin copolymer.

37. The thermally enhanced fluid composition of claim 1, including an effective amount of at least one pour point depressant selected from the group consisting of an alkyl-naphthalene, an acrylic copolymer, a polymethacrylate, a polyfumarates, a styrene ester, an oligomerized alkylphenol, a phthalic acid ester, an ethylenevinyl acetate copolymer, and other mixed hydrocarbon polymers.

38. The thermally enhanced fluid composition of claim 1, including an effective amount of a rust and oxidation inhibitor.

39. The thermally enhanced fluid composition of claim 1, including an effective amount of a demulsifier.

40. The thermally enhanced fluid composition of claim 1, including an effective amount of a foam inhibitor.

41. The thermally enhanced fluid composition of claim 1, including an effective amount of a seal swelling agent.

42. A method of thermally enhancing the conductivity of a fluid composition, comprising the steps of:
  selecting a neat fluid having a selected thermal conductivity;
  selecting a carbon nanomaterial having an aspect ratio of from 500 to 5000 in an effective amount of from 0.001 to 10 percent by weight;
  dispersing said selected carbon nanomaterial having a thermal conductivity greater than the thermal conductivity of said selected neat fluid in which the carbon nanomaterial is dispersed into said neat fluid; and
  adding at least one chemical dispersing agent having a low hydrophile-lipophile balance (HLB) value of 8 or less thereto forming a thermally enhanced fluid.

43. The method of claim 42, including the step of shearing said thermally enhanced fluid containing dispersed nanomaterial.

44. The method of claim 43, wherein said shearing step is selected from the group of processing methods consisting of creating a turbulent flow through a nozzle, creating a turbulent flow thorough a high pressure fuel injector, an ultrasonic device, and combinations thereof to achieve a stable viscosity.

45. A method of thermally enhancing the conductivity of a fluid composition, comprising the steps of:
  selecting a neat fluid having a selected thermal conductivity;
  selecting a carbon nanomaterial having an aspect ratio of from 500 to 5000 in an effective amount of from 0.001 to 10 percent by weight;
  selecting at least one chemical dispersing agent having a low hydrophile-lipophile balance (HLB) value of 8 or less;
  dissolving said at least one chemical dispersing agent into said neat fluid forming a liquid medium dispersing fluid;
  adding said carbon nanomaterial into said liquid medium dispersing fluid while being agitated or ultrasonicated forming a thermally enhanced fluid composition.

46. The method of thermally enhancing the conductivity of a fluid composition of claim 45, including the step of further shearing said thermally enhanced fluid composition containing nanomaterial.

47. The method of claim 46, wherein said shearing step is selected from the group of processing methods consisting of creating a turbulent flow through a nozzle, creating a turbulent flow thorough a high pressure fuel injector, an ultrasonic device, and combinations thereof to achieve a stable viscosity.

48. A method of thermally enhancing the conductivity of a fluid composition, comprising the steps of:
  selecting a neat fluid having a selected thermal conductivity;

selecting a carbon nanomaterial having an aspect ratio of from 500 to 5000 in an effective amount of from 0.001 to 10 percent by weight;

selecting at least one chemical dispersing agent having a low hydrophile-lipophile balance (HLB) value of 8 or less;

dissolving said carbon nanomaterial into said neat fluid forming a liquid medium;

adding said chemical dispersing agent into said liquid medium simultaneously while being agitated or ultrasonicated.

49. The method of thermally enhancing the conductivity of a fluid composition of claim 48, including the step of further shearing said thermally enhanced fluid composition containing nanomaterial.

50. The method of claim 49, wherein said shearing step is selected from the group consisting of creating a turbulent flow through a nozzle, creating a turbulent flow thorough a high pressure fuel injector, an ultrasonic device, and combinations thereof to achieve a stable viscosity.

* * * * *